US012558793B2

(12) United States Patent　　　　(10) Patent No.:　US 12,558,793 B2
　　　　Imanishi　　　　　　　　　　　　(45) Date of Patent:　　Feb. 24, 2026

(54) NUMERICAL CONTROL SYSTEM AND ROBOT CONTROL METHOD

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 353 days.

(21) Appl. No.: 18/007,406

(22) PCT Filed: Aug. 5, 2021

(86) PCT No.: PCT/JP2021/029091
　　　　§ 371 (c)(1),
　　　　(2) Date: Jan. 30, 2023

(87) PCT Pub. No.: WO2022/034848
　　　　PCT Pub. Date: Feb. 17, 2022

(65) Prior Publication Data
　　　　US 2023/0286169 A1　　Sep. 14, 2023

(30) Foreign Application Priority Data
　　　Aug. 11, 2020　　(JP) ................................. 2020-135683

(51) Int. Cl.
　　　*B25J 13/06*　　　　(2006.01)
　　　*B25J 9/16*　　　　(2006.01)
　　　　　　(Continued)

(52) U.S. Cl.
　　　CPC ............. *B25J 13/06* (2013.01); *B25J 9/1664* (2013.01); *G05B 19/4155* (2013.01); *G05B 19/4083* (2013.01)

(58) Field of Classification Search
　　　CPC ..... B25J 13/06; B25J 9/1664; G05B 19/4155; G05B 19/4083; G05B 2219/45213; G05B 19/41825
　　　See application file for complete search history.

(56) References Cited

U.S. PATENT DOCUMENTS 10,545,848 B2 * 1/2020 Guarnieri ............ G06F 11/3624
11,481,434 B1 * 10/2022 Venti ........................ G06F 40/30
　　　　(Continued)

FOREIGN PATENT DOCUMENTS

CN　　108958171 A　　12/2018
CN　　110244659 A　　9/2019
　　　　(Continued)

OTHER PUBLICATIONS

International Search Report issued in PCT/JP2021/029091; mailed Oct. 26, 2021.

*Primary Examiner* — Sohana Tanju Khayer
(74) *Attorney, Agent, or Firm* — Studebaker Brackett PLLC

(57)　　　　ABSTRACT

This numerical control system comprises: a numerical control device 5 that generates a high-level command signal including a robot command signal for a robot 3 according to a numerical control program; and a robot control device 6 that generates a robot control signal for controlling the operation of the robot 3 on the basis of the high-level command signal and inputs the robot control signal to the robot 3. The robot control device 6 includes a control unit 60 that generates the robot control signal by selectively executing one among a dynamic executable file generated on the basis of a dynamic executable file creation command signal and the robot command signal and a static executable file selected on the basis of a static executable file start command signal.

7 Claims, 8 Drawing Sheets

(51) Int. Cl.
    *G05B 19/408*       (2006.01)
    *G05B 19/4155*     (2006.01)

(56)            References Cited

U.S. PATENT DOCUMENTS

| | | | | |
|---|---|---|---|---|
| 11,787,050 | B1 * | 10/2023 | Kaehler | ................. B25J 11/008 |
| | | | | 700/253 |
| 2018/0107821 | A1 * | 4/2018 | Eshkenazi | ............... G06F 21/52 |
| 2019/0278248 | A1 * | 9/2019 | Sagasaki | ................ B23Q 15/04 |
| 2019/0310606 | A1 * | 10/2019 | Hiruma | ................... G06F 17/40 |
| 2020/0396688 | A1 * | 12/2020 | Hong | .................... H04W 24/10 |
| 2020/0397346 | A1 * | 12/2020 | Nakajima | .............. A61B 5/165 |
| 2021/0072730 | A1 * | 3/2021 | Kurokawa | ............ H04L 41/064 |
| 2022/0011754 | A1 * | 1/2022 | Sagasaki | ................ B25J 9/1658 |
| 2023/0069393 | A1 * | 3/2023 | Ogawa | ................... B25J 9/1661 |
| 2023/0153486 | A1 * | 5/2023 | Ohnuki | ................... G06F 30/20 |
| | | | | 703/7 |

FOREIGN PATENT DOCUMENTS

| | | | |
|---|---|---|---|
| JP | 856-011510 | A | 2/1981 |
| JP | 105-216524 | A | 8/1993 |
| JP | H09-285983 | A | 11/1997 |
| JP | H09-305213 | A | 11/1997 |
| JP | 2013-134786 | A | 7/2013 |
| JP | 6647472 | B1 | 2/2020 |
| WO | 2020/026622 | A1 | 2/2020 |

* cited by examiner

FIG. 4

```
N10     G68.8;
N11     G0 J1=__J2=__J3=__J4=__J5=__J6=__;
~
N20     G68.9;
N21     G0 X__Y__Z__A__B__C__P__;
~
N30     M90(OPERATION OF MACHINING BY ROBOT);
N31     M91(OPERATION OF REMOVING BURR BY ROBOT);
N32     M92(OPERATION OF INSPECTING BY ROBOT);
N33     M93(OPERATION OF OUTPUTTING BY ROBOT);
~
N40     G68.8;
N41     G0 J1=__J2=__J3=__J4=__J5=__J6=__;
~
N50     M30;
```

NUMERICAL CONTROL SYSTEM AND ROBOT CONTROL METHOD

TECHNICAL FIELD

The present disclosure relates to a numerical control system and robot control method.

BACKGROUND ART

Typically, a program language of a numerical control program for controlling a machine tool is different from a program language of a robot program for controlling a robot. Thus, in order to cause the machine tool and the robot to operate in parallel, an operator needs to master both the numerical control program and the robot program.

Patent Document 1 discloses a numerical control device that controls both a machine tool and a robot with a numerical control program. More specifically, in a numerical control system disclosed in Patent Document 1, the numerical control device generates a robot command signal in accordance with the numerical control program, and a robot control device generates a robot program on the basis of the robot command signal and generates a robot control signal for controlling the operation of the robot in accordance with the robot program. According to the numerical control system disclosed in Patent Document 1, a user who is familiar with the numerical control program can also control the robot without mastering the robot program.

Patent Document 1: Japanese Patent No. 6647472

DISCLOSURE OF THE INVENTION

Problems to be Solved by the Invention

By the way, a user who is familiar with a robot program often possesses a robot program that runs at an existing robot control device that does not have a robot control function based on a numerical control program.

However, in a technique disclosed in Patent Document 1, combination use of the robot program generated on the basis of the numerical control program and the robot program that runes at the existing robot control device is not sufficiently studied. Thus, there is a possibility of wasting the existing robot program in the technique disclosed in Patent Document 1.

The present disclosure has been made in view of the above-described problem and provides a numerical control system and a robot control method capable of effectively utilizing a robot program that runes at an existing robot control device as well as a robot program automatically generated on the basis of a numerical control program.

Means for Solving the Problems

One aspect of the present disclosure provides a numerical control system including a numerical control device configured to generate a high-level command signal including a robot command signal for a robot in accordance with a numerical control program, and a robot control device capable of performing communication with the numerical control device and configured to generate a robot control signal for controlling operation of the robot on the basis of the high-level command signal and input the robot control signal to the robot, in which the robot control device includes a control unit configured to generate the robot control signal by selectively executing one of a first executable file generated on the basis of the high-level command signal and a second executable file selected on the basis of the high-level command signal.

One aspect of the present disclosure provides a robot control method for controlling a robot by a numerical control device configured to generate a high-level command signal including a robot command signal for the robot in accordance with a numerical control program, and a robot control device capable of performing communication with the numerical control device and configured to generate a robot control signal for controlling operation of the robot on the basis of the high-level command signal and input the robot control signal to the robot, the robot control method including a step of inputting the high-level command signal generated at the numerical control device to the robot control device, a step of generating a first executable file on the basis of the high-level command signal at the robot control device, a step of selecting a second executable file on the basis of the high-level command signal at the robot control device, a step of generating a robot control signal for controlling the operation of the robot by selectively executing one of the first executable file and the second executable file at the robot control device and inputting the robot control signal to the robot.

Effects of the Invention

In one aspect of the present disclosure, a numerical control device generates a high-level command signal including a robot command signal for a robot in accordance with a numerical control program, and a robot control device generates a robot control signal for controlling the operation of the robot on the basis of the high-level command signal generated at the numerical control device and inputs the robot control signal to the robot. Here, the robot control device includes a control unit configured to generate the robot control signal by selectively executing one of a first executable file generated on the basis of the high-level command signal and a second executable file selected on the basis of the high-level command signal. Thus, according to one aspect of the present disclosure, a user who possesses the second executable file that runs at an existing robot control device can control operation of the robot by effectively utilizing an existing second executable file as well as the first executable file automatically generated on the basis of the numerical control program.

BRIEF DESCRIPTION OF THE DRAWINGS

FIG. 4 illustrates an example of a numerical control program for robot;

PREFERRED MODE FOR CARRYING OUT THE INVENTION

A numerical control system 1 according to one embodiment of the present disclosure will be described below with reference to the drawings.

Figure 1:
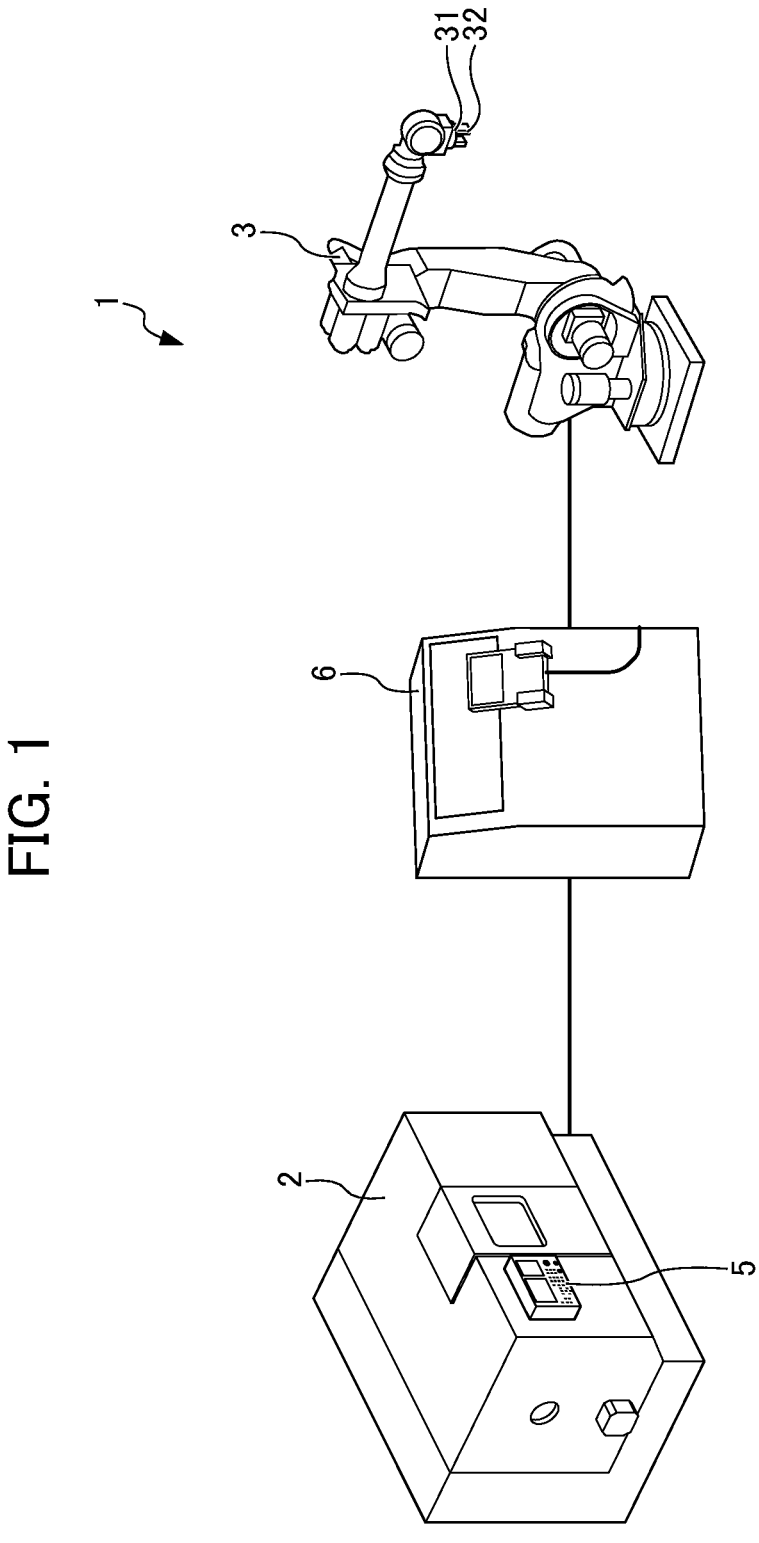
FIG. 1 is a schematic view of a numerical control system according to one embodiment of the present disclosure.

FIG. 1 is a schematic view of the numerical control system 1 according to the present embodiment.

The numerical control system 1 includes a machine tool 2, a numerical control device (CNC) 5 that controls the machine tool 2, a robot 3 provided in the vicinity of the machine tool 2, and a robot control device 6 connected so as to be able to perform communication with the numerical control device 5. The numerical control device 5 generates a machine tool command signal which is a command for the machine tool 2 and a high-level command signal including a robot command signal which is a command for the robot 3 in accordance with a predetermined numerical control program and transmits the machine tool command signal and the high-level command signal respectively to the machine tool 2 and the robot control device 6. The robot control device 6 controls operation of the robot 3 in accordance with the high-level command signal transmitted from the numerical control device 5.

The machine tool 2 machines a workpiece which is not illustrated in accordance with the machine tool command signal transmitted from the numerical control device 5. Here, while the machine tool 2 is, for example, a lathe, drilling machine, milling machine, grinding machine, laser processing machine, injection machine, or the like, the machine tool 2 is not limited to these.

The robot 3 operates under control by the robot control device 6 and performs predetermined work on, for example, the workpiece subjected to machining by the machine tool 2. The robot 3 is, for example, a multijoint robot, and a tool 32 for gripping, machining and inspecting a workpiece is attached to an arm tip portion 31 of the robot 3. While a case will be described below where the robot 3 grips the workpiece subjected to machining by the machine tool 2 at a predetermined position, conveys the gripped workpiece to a predetermined position, machines the gripped workpiece and inspects the gripped workpiece, the present disclosure is not limited to this case. Further, while a case will be described below where the robot 3 is a multijoint robot having six shafts, the present disclosure is not limited to this case. Still further, while a case will be described below where the robot 3 is a multijoint robot having six shafts, the number of shafts is not limited to this.

Each of the numerical control device 5 and the robot control device 6 is a computer constituted with hardware such as arithmetic processing means such as a central processing unit (CPU), auxiliary storage means such as a hard disk drive (HDD) and a solid state drive (SSD) that store various kinds of programs, main storage means such as a random access memory (RAM) for storing data that is temporarily required for the arithmetic processing means to execute the program, operation means such as a keyboard for an operator to perform various kinds of operation and display means such as a display that displays various kinds of information to the operator. The robot control device 6 and the numerical control device 5 can transmit/receive various kind of signals to/from each other through, for example, Ethernet (registered trademark).

Figure 2:
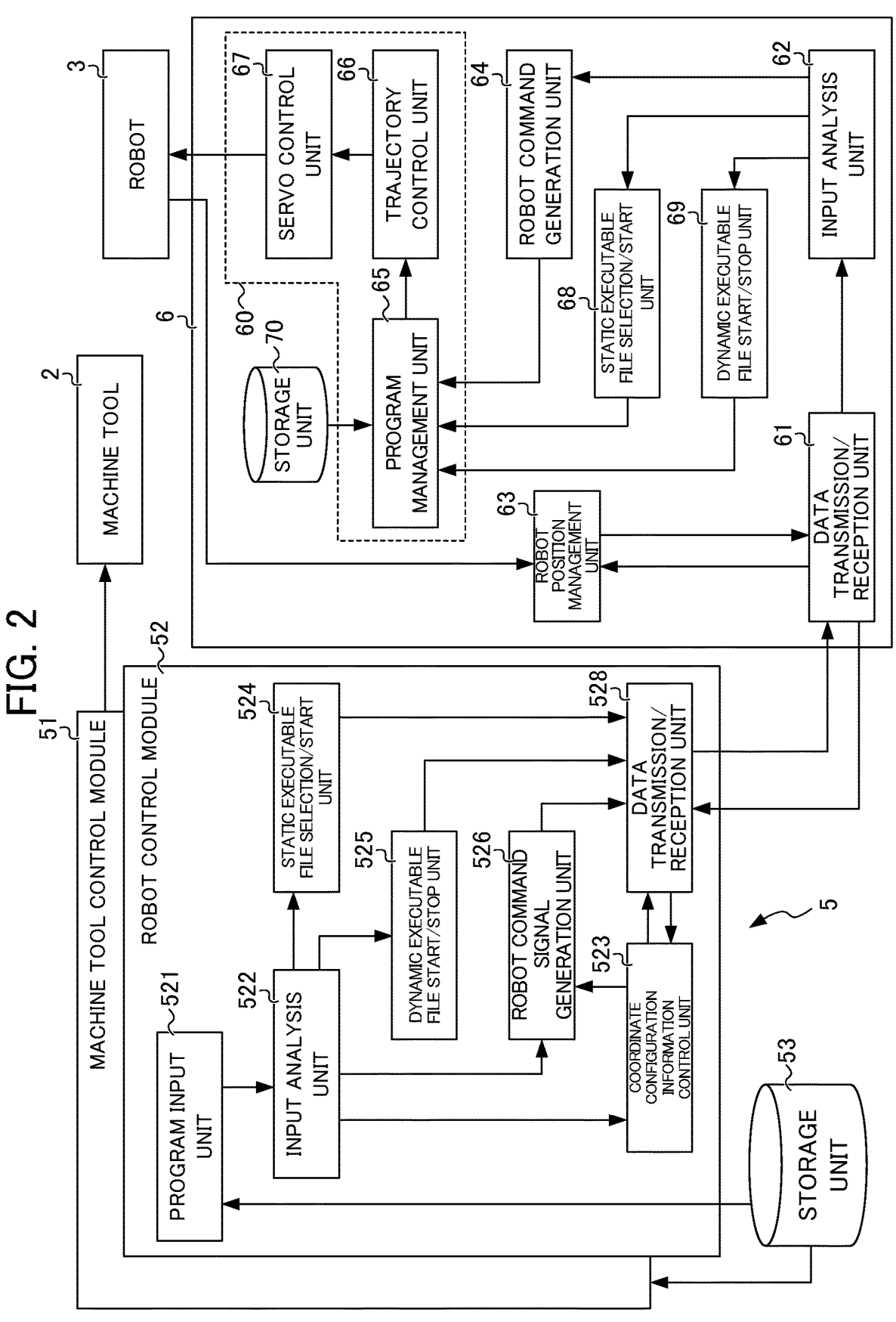
FIG. 2 is a functional block diagram of a numerical control device and a robot control device.

FIG. 2 is a functional block diagram of the numerical control device 5 and the robot control device 6.

The numerical control device 5 generates a high-level command signal including a robot command signal which is a command for the robot 3 in accordance with procedure which will be described below and transmits the generated high-level command signal to the robot control device 6. The robot control device 6 generates a robot control signal for controlling the operation of the robot 3 in accordance with procedure which will be described below on the basis of the high-level command signal transmitted from the numerical control device 5 and controls operation of the robot 3 by inputting the generated robot control signal to the robot 3. As will be described below in detail, the robot control device 6 generates the robot control signal by selectively executing one of a dynamic executable file which is a first executable file generated on the basis of the high-level command signal and a static executable file selected on the basis of the high-level command signal from a plurality of static executable files which are a plurality of second executable files created in advance by an operator.

A detailed configuration of the numerical control device 5 will be described first. As illustrated in FIG. 2, various kinds of functions such as a machine tool control module 51 as a control system of the machine tool 2, a robot control module 52 as a control system of the robot 3, and a storage unit 53 are implemented in the numerical control device 5 by the above-described hardware configuration.

In the storage unit 53, for example, a plurality of numerical control programs created on the basis of operation by the operator are stored. More specifically, in the storage unit 53, a numerical control program for machine tool as a first numerical control program for controlling the operation of the machine tool 2, a numerical control program for robot as a second numerical control program for controlling the operation of the robot 3, and the like, are mainly stored. The numerical control program for machine tool and the numerical control program for robot are described in a common programming language (such as, for example, a G code and an M code).

The numerical control program for machine tool is described on the basis of a machine tool coordinate system as a first coordinate system having an origin at a reference point determined on the machine tool 2 or in the vicinity of the machine tool 2. In other words, in the numerical control program for machine tool, a position and a posture of a control point of the machine tool 2 are described with coordinate values in the machine tool coordinate system.

The numerical control program for robot is described on the basis of a robot coordinate system as a second coordinate system different from the machine tool coordinate system. In other words, in the numerical control program for robot, a position and a posture of a control point (for example, the arm tip portion 31 of the robot 3) of the robot 3 are described with coordinate values in the robot coordinate system different from the machine tool coordinate system. The robot coordinate system is a coordinate system having an origin at a reference point determined on the robot 3 or in the vicinity of the robot 3. Note that while a case will be described below where the robot coordinate system is different from the machine tool coordinate system, the present disclosure is not limited to this case. The robot coordinate system may be made the same as the machine tool coordinate system. In other words, the origin and a coordinate axis direction of the robot coordinate system may be made the same as the origin and a coordinate axis direction of the machine tool coordinate system.

Further, in the numerical control program for robot, the robot coordinate system includes two or more switchable coordinate formats having different control axes. More specifically, in the numerical control program for robot, the position and the posture of the control point of the robot 3 can be designated by an orthogonal coordinate format or a joint coordinate format.

In the joint coordinate format, the position and the posture of the control point of the robot 3 are designated by coordinate values which are a total of six real numbers including rotation angle values (J1, J2, J3, J4, J5 and J6) of six joints of the robot 3 as components.

In the orthogonal coordinate format, the position and the posture of the control point of the robot 3 are designated by coordinate values which are a total of six real numbers including three coordinate values (X, Y and Z) along three orthogonal coordinate axes and three rotation angle values (A, B and C) around the respective orthogonal coordinate axes as components.

Here, the rotation angles of the respective joints of the robot 3 are directly designated under the joint coordinate format, and thus, axial arrangement of a wrist of each arm of the robot 3, rotation numbers of joints that can rotate by equal to or greater than 360 degrees (hereinafter, these will be collectively referred to as a "configuration of the robot 3") are uniquely determined. In contrast, under the orthogonal coordinate format, the position and the posture of the control point of the robot 3 are designated by six coordinate values (X, Y, Z, A, B and C), and thus, the configuration of the robot 3 cannot be uniquely determined. Thus, in the numerical control program for robot, the configuration of the robot 3 is made to be able to be designated by a configuration value P which is an integer value having a predetermined number of digits. Thus, the position and the posture of the control point of the robot 3 and the configuration of the robot 3 are expressed with six coordinate values (J1, J2, J3, J4, J5 and J6) under the joint coordinate format and expressed with six coordinate values and one configuration value (X, Y, Z, A, B, C and P) under the orthogonal coordinate format.

In the numerical control program for robot, the coordinate format can be set using G codes "G68.8" and "G68.9". More specifically, the coordinate format is set to the joint coordinate format by the G code "68.8" being input, and the coordinate format is set to the orthogonal coordinate format by the G code "68.9" being input. The G codes "68.8" and "68.9" for setting these coordinate formats are modal. Thus, the coordinate format is maintained until the coordinate format is changed again with these G codes after the coordinate format is set to the joint coordinate format or the orthogonal coordinate formed with these G codes. Note that while, in the present embodiment, in a case where the G codes for setting these coordinate formats are not described in the numerical control program for robot, the coordinate format is automatically set to the orthogonal coordinate format, the present disclosure is not limited to this case.

The machine tool control module 51 generates a machine tool command signal which is mainly a command for the machine tool 2 in accordance with the numerical control program for machine tool and inputs the machine tool command signal to an actuator (not illustrated) of the machine tool 2. More specifically, the machine tool control module 51 reads out the numerical control program for machine tool stored in the storage unit 53 and generates the machine tool command signal by analyzing a command type based on the numerical control program. The machine tool 2 operates in accordance with the machine tool command signal transmitted from the machine tool control module 51 and machines a workpiece (not illustrated). Note that as will be described later with reference to FIG. 6, in a case where the numerical control program for machine tool is executed in synchronization with the numerical control program for robot at the machine tool control module 51, the high-level command signal for the robot control device 6 may be generated in accordance with the numerical control program for machine tool at the machine tool control module 51. The high-level command signal generated at the machine tool control module 51 is transmitted to the robot control device 6 by a data transmission/reception unit 528 which will be described later.

The robot control module 52 generates high-level command signals including a robot command signal which is a command for the robot 3 and various kinds of signals, and the like, for the robot control device 6 in accordance with the numerical control program for robot and transmits these high-level command signals to the robot control device 6. More specifically, the robot control module 52 includes a program input unit 521, an input analysis unit 522, a coordinate configuration information control unit 523, a static executable file selection/start unit 524, a dynamic executable file start/stop unit 525, a robot command signal generation unit 526, a coordinate display unit 527, and a data transmission/reception unit 528 and generates the high-level command signal by these. As will be described below, the high-level command signal generated at the numerical control device 5 and transmitted to the robot control device 6 includes a robot command signal, a reference coordinate value request signal, a reference configuration value request signal, a static executable file start command signal, a dynamic executable file creation command signal, and a dynamic executable file stop command signal.

The program input unit 521 reads out the numerical control program for robot from the storage unit 53 and sequentially inputs the numerical control program for robot to the input analysis unit 522.

The input analysis unit 522 sequentially analyzes a command type based on the numerical control program input from the program input unit 521 for each block and transmits an analysis result to the coordinate configuration information control unit 523, the static executable file selection/start unit 524, the dynamic executable file start/stop unit 525 and the robot command signal generation unit 526.

The coordinate configuration information control unit 523 specifies a designated coordinate format which is a coordinate format set on the basis of the numerical control program for robot, on the basis of the analysis result input from the input analysis unit 522. As described above, in the numerical control program for robot, the coordinate format can be set or changed to the joint coordinate format or the orthogonal coordinate format by the predetermined G codes. The coordinate configuration information control unit 523 specifies the designated coordinate format on the basis of the analysis result input from the input analysis unit 522 and transmits information regarding a current designated coordinate format to the robot command signal generation unit 526.

The coordinate configuration information control unit 523 writes a reference coordinate value request signal for newly acquiring a reference coordinate value corresponding to a current coordinate value of each control axis in the specified designated coordinate format from the robot control device 6 and a reference configuration value request signal for newly acquiring a reference configuration value corresponding to a current configuration value of the robot 3 from the robot control device 6 in the data transmission/reception unit 528 at a predetermined timing during execution of the numerical control program for robot and transmits these reference coordinate value request signal and reference configuration value request signal to the robot control device 6.

The coordinate configuration information control unit 523 determines whether or not it is necessary to acquire the reference coordinate value and the reference configuration value during execution of the numerical control program for robot at the robot control module 52, and in a case where it is determined that it is necessary to acquire the reference coordinate value, transmits a reference coordinate request signal to the robot control device 6, and in a case where it is determined that it is necessary to acquire the reference configuration value, transmits the reference configuration value request signal to the robot control device 6.

More specifically, in a case of upon start of execution of the numerical control program for robot, in a case where upon restart of the numerical control program for robot that is interrupted for some reason, in a case where a new designated coordinate format is set on the basis of the numerical control program for robot, and in a case where the designated coordinate format is changed on the basis of the numerical control program for robot, the coordinate configuration information control unit 523 determines that it is necessary to acquire the reference coordinate value and writes the reference coordinate value request signal in the data transmission/reception unit 528. By this means, the reference coordinate value request signal is transmitted from the data transmission/reception unit 528 to the robot control device 6.

Further, in a case where at least the designated coordinate format is the orthogonal coordinate format, the coordinate configuration information control unit 523 determines that it is necessary to acquire the reference configuration value and writes the reference configuration value request signal in the data transmission/reception unit 528. By this means, the reference configuration value request signal is transmitted from the data transmission/reception unit 528 to the robot control device 6. More specifically, in a case where execution of the numerical control program for robot is started while the designated coordinate format is set as the orthogonal coordinate format, and in a case where the designated coordinate format is the orthogonal coordinate format, and the configuration value is not designated in the numerical control program, the coordinate configuration information control unit 523 determines that it is necessary to acquire the reference configuration value and transmits the reference configuration value request signal to the robot control device 6. Further, in a case where the designated coordinate format is the orthogonal coordinate format, and the configuration value is designated in the numerical control program, the coordinate configuration information control unit 523 determines that it is not necessary to acquire the reference configuration value and does not transmit the reference configuration value request signal to the robot control device 6. In other words, in a case where the configuration value is designated in the numerical control program, the coordinate configuration information control unit 523 generates the robot command signal while prioritizing the configuration value designated in the numerical control program over the reference configuration value acquired at the robot control device 6.

Further, the coordinate configuration information control unit 523 manages coordinate information including a coordinate value of each control axis in the designated coordinate format specified as described above as a component and configuration information including a configuration value of the robot 3 as a component by a memory (not illustrated).

Figure 3A:
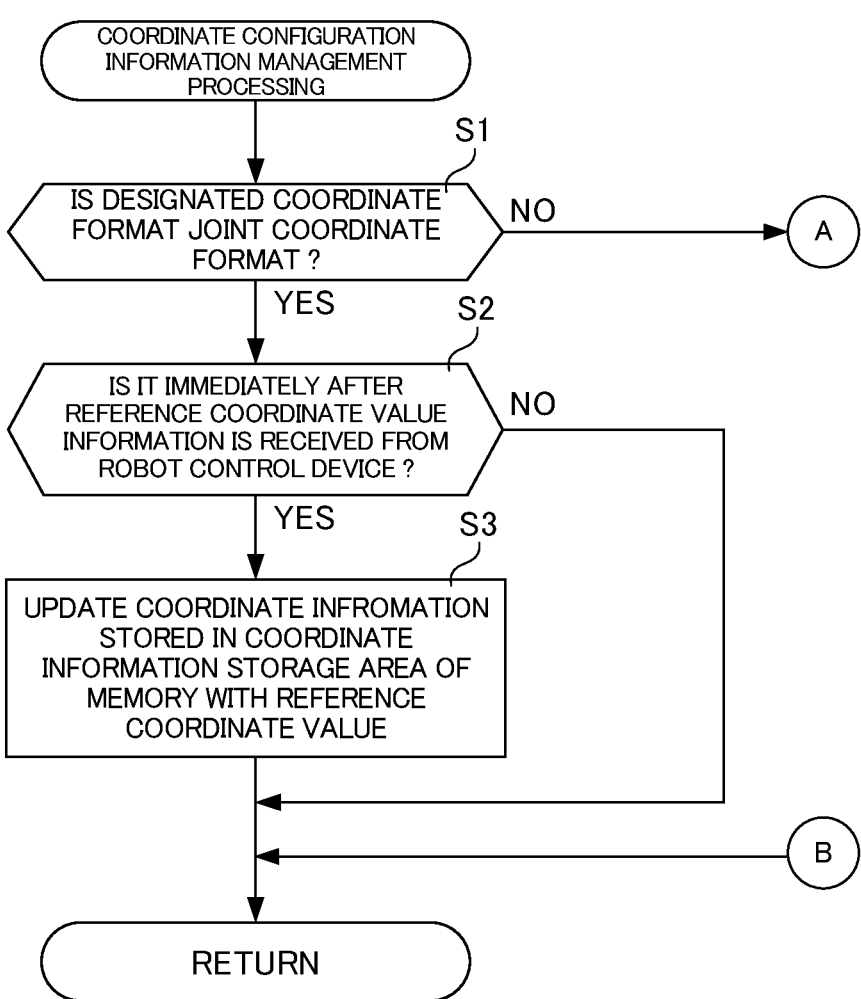
FIG. 3A is a flowchart (No. 1) illustrating procedure of coordinate configuration information management processing.
Figure 3B:
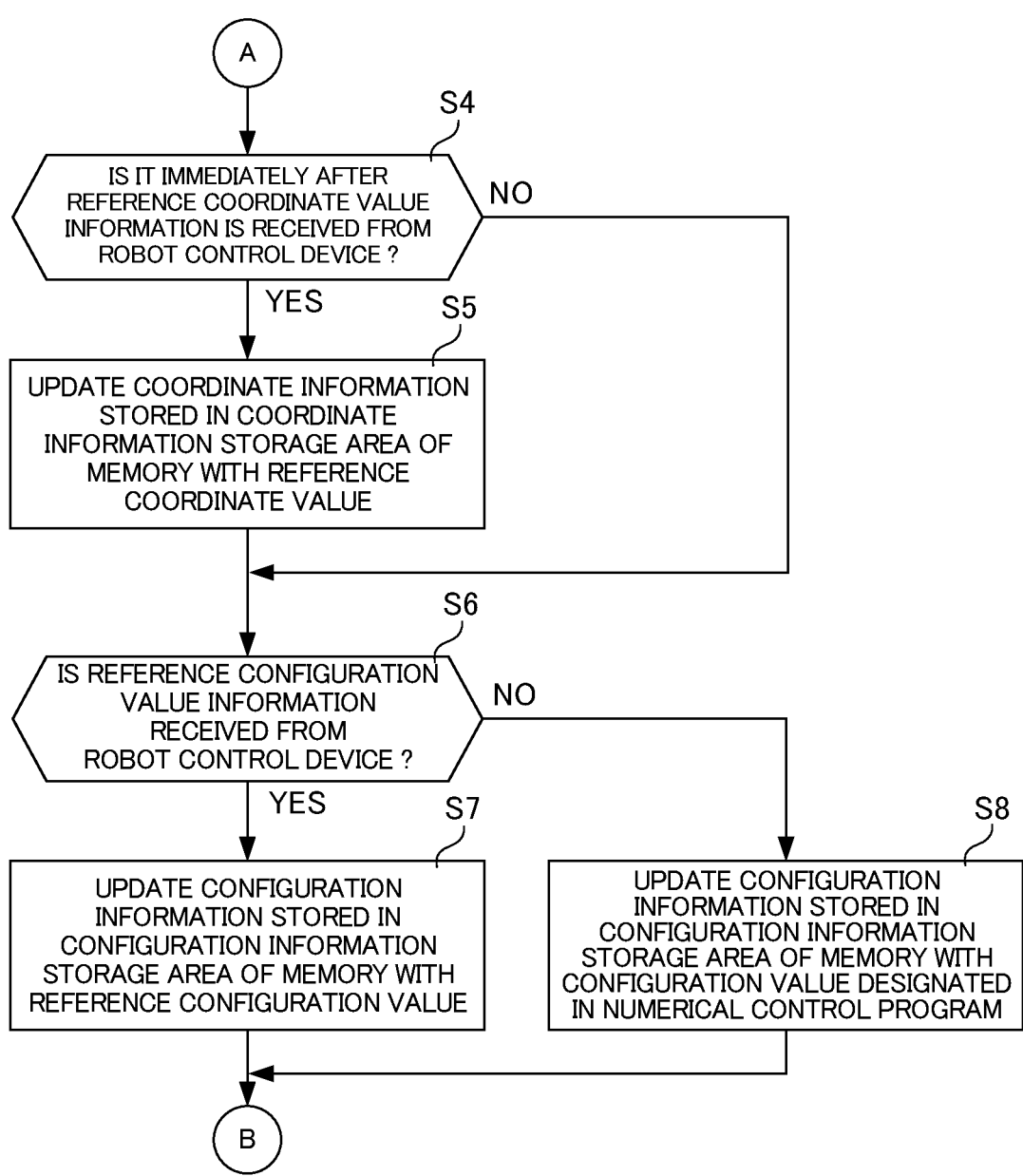
FIG. 3B is a flowchart (No. 2) illustrating procedure of the coordinate configuration information management processing.

FIG. 3A and FIG. 3B are flowcharts illustrating procedure of processing of managing the coordinate information and the configuration information (hereinafter, referred to as "coordinate configuration information management processing") under the designated coordinate format by the coordinate configuration information control unit 523. The coordinate configuration information management processing illustrated in FIG. 3A and FIG. 3B is repeatedly executed at predetermined periods at the coordinate configuration information control unit 523 during execution of the numerical control program for robot at the robot control module 52.

First, in S1, the coordinate configuration information control unit 523 determines whether or not the designated coordinate format is the joint coordinate format. In a case where the determination result in S1 is Yes, the processing of the coordinate configuration information control unit 523 transitions to S2, and in a case where the determination result in S1 is No, the processing transitions to S4.

In S2, the coordinate configuration information control unit 523 determines whether or not it is immediately after the reference coordinate value information including the latest reference coordinate value is received from the robot control device 6. As described above, the reference coordinate value is a current coordinate value of each control axis in the designated coordinate format. As will be described later, the robot control device 6 acquires the reference coordinate value in response to the reference coordinate value request signal transmitted from the coordinate configuration information control unit 523 at a predetermined timing and sends back the reference coordinate value information including the reference coordinate value to the numerical control device 5. In a case where the determination result in S2 is Yes, the processing of the coordinate configuration information control unit 523 transitions to S3, and in a case where the determination result in S is No, the coordinate configuration information control unit 523 ends the processing illustrated in FIG. 3A and FIG. 3B.

In S3, the coordinate configuration information control unit 523 updates the coordinate information stored in a memory (not illustrated) with the reference coordinate value transmitted from the robot control device 6 and then ends the processing illustrated in FIG. 3A and FIG. 3B.

In S4, the coordinate configuration information control unit 523 determines whether or not it is immediately after the reference coordinate value information including the latest reference coordinate value is received from the robot control device 6. In a case where the determination result in S4 is Yes, the processing of the coordinate configuration information control unit 523 transitions to S5, and in a case where the determination result in S4 is No, the processing transitions to S6.

In S6, the coordinate configuration information control unit 523 determines whether or not the reference configuration value information including the latest reference configuration is received from the robot control device 6. As described above, the reference configuration value is a current configuration value of the robot 3. As will be described later, the robot control device 6 acquires the reference configuration value in response to the reference configuration value request signal transmitted from the coordinate configuration information control unit 523 at a predetermined timing and sends back the reference configuration value information including the reference configuration value to the numerical control device 5. In a case where the determination result in S6 is Yes, the processing of the coordinate configuration information control unit 523 transitions to S7, and in a case where the determination result in S6 is No, the processing transitions to S8.

In S7, the coordinate configuration information control unit 523 updates the configuration information stored in the memory with the reference configuration value transmitted from the robot control device 6 and then ends the processing illustrated in FIG. 3A and FIG. 3B. More specifically, the coordinate configuration information control unit 523 substitutes the configuration value stored in the memory for the reference configuration value transmitted from the robot control device 6.

In S8, the coordinate configuration information control unit 523 updates the configuration information stored in the memory with the configuration value designated in the numerical control program input from the input analysis unit 522 and then ends the processing illustrated in FIG. 3A and FIG. 3B.

As described above, the coordinate configuration information control unit 523 updates the reference coordinate value stored in the memory at a timing at which the reference coordinate value transmitted from the robot control device 6 is received.

Further, in a case where the designated coordinate format is the orthogonal coordinate format, the coordinate configuration information control unit 523 updates the configuration information stored in the memory with the reference configuration value transmitted from the robot control device 6 or the configuration value designated in the numerical control program. More specifically, in a case where the reference configuration value transmitted from the robot control device 6 is received, the coordinate configuration information control unit 523 updates the configuration information stored in the memory with the reference configuration value, otherwise, updates the configuration information stored in the memory with the configuration value designated in the numerical control program.

Returning to FIG. 2, the static executable file selection/start unit 524 generates a static executable file start command signal for causing one of a plurality of static executable files which are created in advance and which will be described later to be executed at the robot control device 6 on the basis of the analysis result input from the input analysis unit 522 and writes the static executable file start command signal in the data transmission/reception unit 528. By this means, the static executable file start command signal is transmitted from the data transmission/reception unit 528 to the robot control device 6.

In the numerical control program at the numerical control device 5, one of the plurality of static executable files stored in the robot control device 6 can be selected by, for example, an M code and can be executed at the robot control device 6. Thus, in a case where an M code (such as, for example, "M90", "M91", "M92", "M93" and "M60" as will be described later with reference to FIG. 4 and FIG. 6) allocated for designating the static executable file is extracted in the numerical control program for robot, the static executable file selection/start unit 524 generates a static executable file start command signal for selecting and activating the static executable file designated by the M code at the robot control device 6 and transmits the generated static executable file start command signal to the robot control device 6 via the data transmission/reception unit 528.

The dynamic executable file start/stop unit 525 generates a dynamic executable file creation command signal or a dynamic executable file stop command signal on the basis of the analysis result input from the input analysis unit 522 and writes these command signals in the data transmission/reception unit 528. By this means, the dynamic executable file creation command signal or the dynamic executable file stop command signal is transmitted from the data transmission/reception unit 528 to the robot control device 6. Here, the dynamic executable file creation command signal is a command signal for causing a dynamic executable file to be newly created at the robot control device 6, and the dynamic executable file stop command signal is a command signal for stopping execution of the dynamic executable file at the robot control device 6.

As will be described later, the robot command signal generation unit 526 generates a robot command signal for controlling the operation of the robot 3 on the basis of the G code in the numerical control program and transmits the robot command signal to the robot control device 6. Further, the robot control device 6 generates the robot control signal for the robot 3 by sequentially adding a command in accordance with the robot command signal transmitted from the numerical control device 5 to the dynamic executable file and executing the command.

Thus, the dynamic executable file start/stop unit 525 generates a dynamic executable file creation command signal to newly create a dynamic executable file at the robot control device 6 upon starting control of operation of the robot 3 based on the G code described in the numerical control program and transmits the generated dynamic executable file creation command signal to the robot control device 6 via the data transmission/reception unit 528. More specifically, in a case where a G code is extracted for the first time in the numerical control program, in a case where a G code is extracted for the first time in the numerical control program after execution of the static executable file ends at the robot control device 6 or in a case where a G code (for example, "G200.1") determined for issuing a command to create the dynamic executable file in the numerical control program is extracted, the dynamic executable file start/stop unit 525 generates a dynamic executable file creation command signal and transmits the generated dynamic executable file creation command signal to the robot control device 6 via the data transmission/reception unit 528.

Further, the robot control device 6 generates the robot control signal by selectively executing one of the dynamic executable file and the static executable file. In other words, the robot control device 6 does not execute both the dynamic executable file and the static executable file at the same time.

Thus, in a case where an M code (such as, for example, "M90", "M91", "M92", "M93" and "M60" as will be described later with reference to FIG. 4 and FIG. 6) allocated for designating the static executable file is extracted in the numerical control program for robot (that is, in a case where the static executable file start command signal is transmitted from the static executable file selection/start unit 524), in a case where a command (for example, "M30") that declares an end program is extracted in the numerical control program, or in a case where a G code (for example, "G200.0") determined for issuing a command to stop the dynamic executable file is extracted in the numerical control program, the dynamic executable file start/stop unit 525 generates a dynamic executable file stop command signal and transmits the generated executable file stop command signal to the robot control device 6 via the data transmission/reception unit 528.

The robot command signal generation unit 526 generates the robot command signal in accordance with the numerical control program on the basis of the latest coordinate information and the configuration information stored in the memory of the coordinate configuration information control unit 523 and the analysis result of the numerical control program input from the input analysis unit 522, write the generated robot command signal in the data transmission/reception unit 528 and transmits the robot command signal to the robot control device 6.

Here, a case will be described where the command type based on the numerical control program is accompanied by change of the position and the posture of the control point of the robot 3 and the configuration of the robot 3 (specifically, for example, a case where the G code is "G00" corresponding to positioning (rapid traverse), a case where the G code is "G01" corresponding to linear interpolation, or the like). In this case, the robot command signal generation unit 526 calculates an end point of the control point and speed of the robot 3 in a case where the coordinate value stored in the memory of the coordinate configuration information control unit 523 is set as a start point of the control point of the robot 3 under the designated coordinate format and writes the robot command signal including information regarding the designated coordinate format, the end point and the speed in the data transmission/reception unit 528. Further, the robot command signal generation unit 526 calculates an end point coordinate value of the control point of the robot 3 as described above and then updates a start point coordinate value stored in the memory of the coordinate configuration information control unit 523 with the calculated end point coordinate value.

If the robot command signal is written by the robot command signal generation unit 526, the data transmission/reception unit 528 transmits the robot command signal to a data transmission/reception unit 61 of the robot control device 6. If the reference coordinate value request signal and the reference configuration value request signal are written by the coordinate configuration information control unit 523, the data transmission/reception unit 528 transmits these reference coordinate value request signal and reference configuration value request signal to the data transmission/reception unit 61 of the robot control device 6. If the static executable file start command signal is written by the static executable file selection/start unit 524, the data transmission/reception unit 528 transmits the static executable file start command signal to the data transmission/reception unit 61 of the robot control device 6. Further, if the dynamic executable file creation command signal and the dynamic executable file stop command signal are written by the dynamic executable file start/stop unit 525, the data transmission/reception unit 528 transmits these dynamic executable file creation command signal and dynamic executable file stop command signal to the data transmission/reception unit 61 of the robot control device 6.

If the reference coordinate value information and the reference configuration value information transmitted from the data transmission/reception unit 61 of the robot control device 6 are received, the data transmission/reception unit 528 transmits these reference coordinate value information and reference configuration value information to the coordinate configuration information control unit 523.

A configuration of the robot control device 6 will be described in detail next. As illustrated in FIG. 2, various kinds of functions such as the data transmission/reception unit 61, an input analysis unit 62, a robot position management unit 63, a robot command generation unit 64, a control unit 60, a static executable file selection/start unit 68, a dynamic executable file start/stop unit 69 and a storage unit 70 are implemented at the robot control device 6 by the above-described hardware configuration.

If the robot command signal, the static executable file start command signal, the dynamic executable file creation command signal and the dynamic executable file stop command signal that are transmitted from the data transmission/reception unit 528 of the numerical control device 5 are received, the data transmission/reception unit 61 transmits these signals to the input analysis unit 62. Further, if the reference coordinate value request signal and the reference configuration value request signal that are transmitted from the data transmission/reception unit 528 are received, the data transmission/reception unit 61 transmits these signals to the robot position management unit 63.

If the reference coordinate value information and the reference configuration value information are written by the robot position management unit 63, the data transmission/reception unit 61 transmits these reference coordinate value information and reference configuration value information to the data transmission/reception unit 528 of the numerical control device 5 through procedure which will be described later.

If the reference coordinate value request signal transmitted from the data transmission/reception unit 61 is received, the robot position management unit 63 acquires detection values of various kinds of position sensors (not illustrated) provided at the robot 3 and calculates coordinate values of the respective control axes in the robot coordinate system on the basis of these detection values under the designated coordinate format. The robot position management unit 63 sets the calculated coordinate values as the reference coordinate values and writes the reference coordinate value information including these reference coordinate values in the data transmission/reception unit 61. By this means, the reference coordinate value information is transmitted from the data transmission/reception unit 61 to the numerical control device 5.

Further, if the reference configuration value request signal transmitted from the data transmission/reception unit 61 is received, the robot position management unit 63 acquires detection values of various kinds of position sensors provided at the robot 3 and calculates a configuration value of the robot 3 on the basis of these detection values. The robot position management unit 63 sets the calculated configuration value as the reference configuration value and writes the reference configuration value information including the reference configuration value in the data transmission/reception unit 61. By this means, the reference configuration value information is transmitted from the data transmission/reception unit 61 to the numerical control device 5.

If the robot command signal transmitted from the data transmission/reception unit 61 is received, the input analysis unit 62 transmits the robot command signal to the robot command generation unit 64. If the static executable file start command signal transmitted from the data transmission/reception unit 61 is received, the input analysis unit 62 transmits the static executable file start command signal to the static executable file selection/start unit 68. If the dynamic executable file creation command signal and the dynamic executable file stop command signal transmitted from the data transmission/reception unit 61 are received, the input analysis unit 62 transmits these dynamic executable file creation command signal and dynamic executable file stop command signal to the dynamic executable file start/stop unit 69.

The control unit 60 generates a robot control signal by selectively executing one of the dynamic executable file which is generated on the basis of the dynamic executable file creation command signal and the robot command signal transmitted from the numerical control device 5 and which is sequentially added and the static executable file selected on the basis of the static executable file start command signal transmitted from the numerical control device 5 and inputs the robot control signal in each servomotor of the robot 3. More specifically, the control unit 60 includes a program management unit 65, a trajectory control unit 66 and a servo control unit 67.

In a case where a static executable file is selected through procedure which will be described later in the static executable file selection/start unit 68, the program management unit 65 generates an operation plan of the robot 3 by executing the selected static executable file and transmits the operation plan to the trajectory control unit 66. Further, in a case where a dynamic executable file is generated through procedure which will be described later in the dynamic executable file start/stop unit 69, the program management unit 65 generates an operation plan of the robot 3 by executing the generated dynamic executable file and transmits the operation plan to the trajectory control unit 66.

The trajectory control unit 66 calculates a trajectory of the control point of the robot 3 on the basis of the operation plan generated by the program management unit 65, calculates angles of respective joints of the robot 3 in accordance with the calculated trajectory as target angles and transmits these target angles to the servo control unit 67.

The servo control unit 67 generates a robot control signal for the robot 3 by performing feedback control on each servomotor of the robot 3 so as to achieve the target angles of the respective joints transmitted from the trajectory control unit 66 and inputs the robot control signal to the servomotors of the robot 3.

In the storage unit 70, a plurality of static executable files that can be executed at the program management unit 65 are stored. The static executable file is a binary file created on the basis of a robot program that determines procedure for causing the robot 3 to implement predetermined operation of the robot 3 (such as, for example, operation of machining a workpiece by the robot 3, operation of removing burr of a workpiece by the robot 3, operation of inspecting a workpiece by the robot 3, operation of outputting a workpiece by the robot 3, and operation of replacing a workpiece by the robot 3), and the file created in advance by an operator is used. The respective static executable files stored in the storage unit 70 are associated with M codes in the numerical control program at the numerical control device 5. For example, as will be described later with reference to FIG. 4 and FIG. 6, a static executable file for performing operation of machining a workpiece is associated with "M90", a static executable file for performing operation of removing burr of a workpiece is associated with "M91", a static executable file for performing operation of inspecting a workpiece is associated with "M92", a static executable file for performing operation of outputting a workpiece is associated with "M93", and a static executable file for performing operation of replacing a workpiece is associated with "M60".

If the static executable file start command signal transmitted from the input analysis unit 62 is received, the static executable file selection/start unit 68 selects a static executable file associated with the received static executable file start command signal from the plurality of static executable files stored in the storage unit 70 and causes the program management unit 65 to execute the selected static executable file.

If the dynamic executable file creation command signal transmitted from the input analysis unit 62 is received, the dynamic executable file start/stop unit 69 generates a dynamic executable file to which a command is sequentially added through procedure which will be described later at the robot command generation unit 64 and causes the program management unit 65 to execute the generated dynamic executable file. Further, if the dynamic executable file stop command signal transmitted from the input analysis unit 62 is received, the dynamic executable file start/stop unit 69 stops the dynamic executable file that is being executed at the program management unit 65 and deletes the dynamic executable file.

If the robot command signal transmitted from the input analysis unit 62 is received, the robot command generation unit 64 sequentially adds a command in accordance with the received robot command signal to the dynamic executable file that is being executed at the program management unit 65. At the program management unit 65, by the dynamic executable file to which a command is sequentially added by the robot command generation unit 64 being executed as described above, the robot 3 can implement operation specified on the basis of the numerical control program of the numerical control device 5.

Specific procedure of a robot control method for controlling the robot 3 in the numerical control system 1 configured as described above will be described next.

The numerical control device 5 generates the robot command signal, the reference coordinate value request signal, the reference configuration value request signal, the static executable file start command signal, the dynamic executable file creation command signal and the dynamic executable file stop command signal which are high-level command signals for the robot control device 6 on the basis of the numerical control program stored in the storage unit 53 and inputs these high-level command signals to the robot control device 6.

If the dynamic executable file creation command signal is received from the numerical control device 5, the dynamic executable file start/stop unit 69 of the robot control device 6 generates a dynamic executable file on the basis of the dynamic executable file creation command signal. Further, if the robot command signal is received from the numerical control device 5, the robot command generation unit 64 of the robot control device 6 sequentially adds a command in accordance with the robot command signal to the dynamic executable file generated by the dynamic executable file start/stop unit 69. Further, the control unit 60 of the robot control device 6 generates a robot control signal by executing the dynamic executable file which is generated by the dynamic executable file start/stop unit 69 and to which the command is sequentially added by the robot command generation unit 64 as described above and inputs the robot control signal to the robot 3. Subsequently, if the dynamic executable file stop command signal is received from the numerical control device 5, the dynamic executable file start/stop unit 69 stops the dynamic executable file that is being executed at the control unit 60 and deletes the dynamic executable file. If the dynamic executable file that is being executed is stopped by the dynamic executable file start/stop unit 69, the control unit 60 generates a robot control signal to decelerate and stop the robot 3 and inputs the robot control signal to the robot 3.

Further, if the static executable file start command signal is received from the numerical control device 5, the static executable file selection/start unit 68 of the robot control device 6 selects a static executable file designated by the received static executable file start command signal from the plurality of static executable files stored in the storage unit 70. If the static executable file is selected by the static executable file selection/start unit 68 as described above, the control unit 60 generates a robot control signal by executing the selected static executable file and inputs the robot control signal to the robot 3.

As described above, the robot control device 6 generates the robot control signal by selectively executing one of the dynamic executable file and the static executable file on the basis of the robot command signal, the static executable file start command signal, the dynamic executable file creation command signal, and the dynamic executable file stop command signal that are transmitted from the numerical control device 5 and inputs the robot control signal to the robot 3.

Figure 5A:
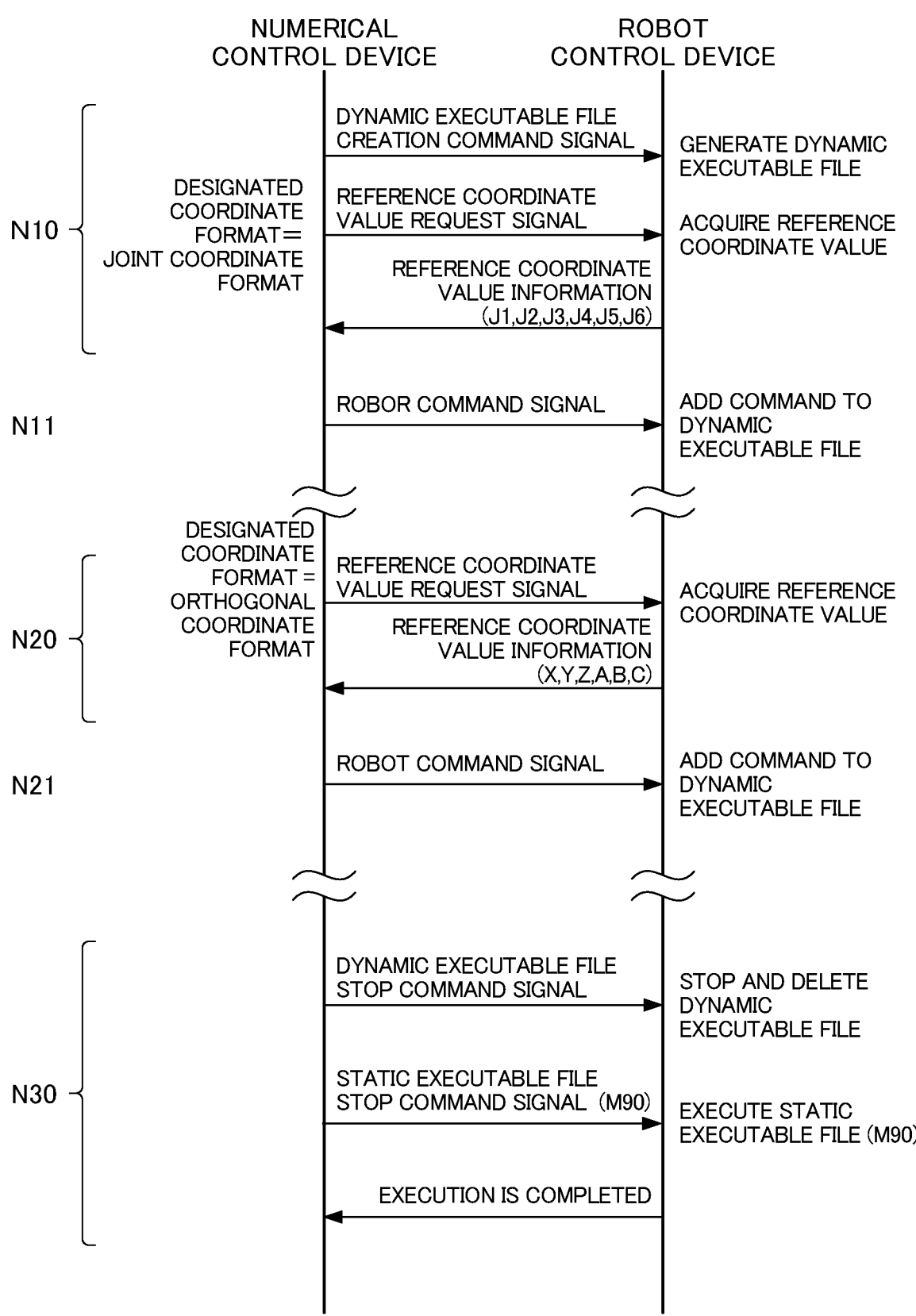
FIG. 5A is a sequence diagram (No. 1) illustrating flow, and the like, of various kinds of information in a case where the numerical control device is activated on the basis of the numerical control program for robot illustrated in FIG. 4.
Figure 5B:
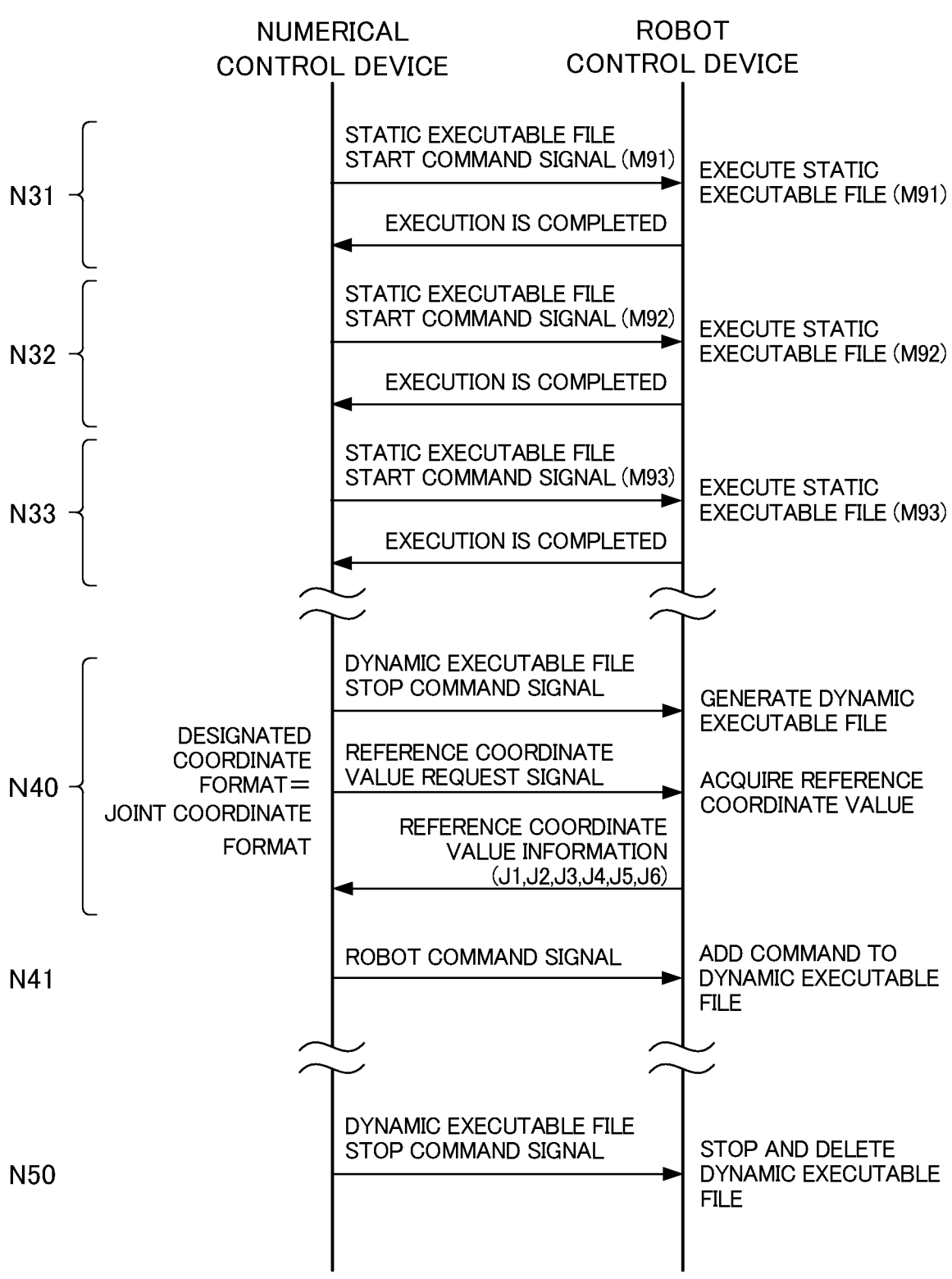
FIG. 5B is a sequence diagram (No. 2) illustrating flow, and the like, of various kinds of information in a case where the numerical control device is activated on the basis of the numerical control program for robot illustrated in FIG. 4.

Flow of various kinds of signals and information in the numerical control system 1 configured as described above will be described next with reference to FIG. 4, FIG. 5A and FIG. 5B.

FIG. 4 illustrates an example of the numerical control program for robot. FIG. 5A and FIG. 5B are sequence diagrams illustrating flow of signals and information between the numerical control device 5 and the robot control device 6 in a case where the numerical control device 5 is activated on the basis of the numerical control program for robot illustrated in FIG. 4 and processing to be executed at the robot control device 6.

First, in a block indicated with a sequence number "N10", a command "G68.8" by the G code is input to the coordinate configuration information control unit 523 and the dynamic executable file start/stop unit 525 of the numerical control device 5. The dynamic executable file start/stop unit 525 transmits the dynamic executable file creation command signal to the dynamic executable file start/stop unit 69 of the robot control device 6 in response to the G code being extracted for the first time in the numerical control program. Further, the dynamic executable file start/stop unit 69 newly generates a dynamic executable file in response to reception of the dynamic executable file creation command signal and causes the control unit 60 to execute the generated dynamic executable file.

Still further, in a block indicated with a sequence number "N10", the coordinate configuration information control unit 523 sets the joint coordinate format as the designated coordinate format and transmits the reference coordinate value request signal to the robot position management unit 63 of the robot control device 6. The robot position management unit 63 acquires reference coordinate values (J1, J2, J3, J4, J5 and J6) under the current designated coordinate format in response to reception of the reference coordinate value request signal and transmits the reference coordinate value information including the reference coordinate values to the coordinate configuration information control unit 523. Further, the coordinate configuration information control unit 523 updates the coordinate information stored in the memory with the received reference coordinate values.

Next, in a block indicated with a sequence number "N11", a command "G0 J1=_J2=_J3=_J4=_J5=_J6=_" based on the joint coordinate format is input to the robot command signal generation unit 526 of the numerical control device 5. Note that an end point coordinate value is input to portions of the underbars in the command. The robot command signal generation unit 526 generates a robot command signal on the basis of the coordinate information stored in the memory of the coordinate configuration information control unit 523 and the input command and transmits the robot command signal to the robot command generation unit 64 of the robot control device 6. The robot command generation unit 64 adds the command in accordance with the received robot command signal to the dynamic executable file that is being executed at the control unit 60. The control unit 60 generates a robot control signal in accordance with the command added to the dynamic executable file and inputs the robot control signal to the robot 3.

Next, in a block indicated with a sequence number "N20", a command "G68.9" by the G code is input to the coordinate configuration information control unit 523 of the numerical control device 5. In response to this, the coordinate configuration information control unit 523 changes the designated coordinate format from the joint coordinate format that has been set so far to the orthogonal coordinate format. Further, the coordinate configuration information control unit 523 transmits the reference coordinate value request signal to the robot position management unit 63 of the robot control device 6 in response to change of the designated coordinate format in this block. The robot position management unit 63 acquires reference coordinate values (X, Y, Z, A, B and C) under the current designated coordinate format in response to reception of the reference coordinate value request signal and transmits the reference coordinate value information including the reference coordinate values to the coordinate configuration information control unit 523 of the numerical control device 5. Further, the coordinate configuration information control unit 523 updates the coordinate information stored in the memory with the received reference coordinate values.

Next, in a block indicated with a sequence number "N21", a command "G1 X_Y_Z_A_B_C_P_" based on the orthogonal coordinate format is input to the command configuration information control unit 523 and the robot command signal generation unit 526 of the numerical control device 5. Note that a configuration value of the robot 3 is designated in the command input in this block. In a case where the configuration value is designated in the command in this manner, the coordinate configuration information control unit 523 does not transmit the reference configuration value request signal. Further, in this case, the coordinate configuration information control unit 523 updates the configuration information stored in the memory with the configuration value designated in the input command.

After the configuration information is updated as described above, the robot command signal generation unit 526 of the numerical control device 5 generates a robot command signal on the basis of the coordinate information and the configuration information stored in the memory of the coordinate configuration information control unit 523 and the input command and transmits the robot command signal to the robot command generation unit 64 of the robot control device 6. The robot command generation unit 64 adds the command in accordance with the received robot command signal to the dynamic executable file that is being executed at the control unit 60. The control unit 60 generates a robot control signal in accordance with the command added to the dynamic executable file and inputs the robot control signal to the robot 3.

Next, in a block indicated with a sequence number "N30", a command "M90" by the M code is input to the dynamic executable file start/stop unit 525 and the static executable file selection/start unit 524 of the numerical control device 5. The dynamic executable file start/stop unit 525 transmits a dynamic executable file stop command signal to the dynamic executable file start/stop unit 69 of the robot control device 6 in response to the M code allocated for designating the static executable file being extracted in the numerical control program. Further, the dynamic executable file start/stop unit 69 stops and deletes the dynamic executable file that is being executed at the control unit 60 in response to reception of the dynamic executable file stop command signal. The control unit 60 generates a robot control signal so as to decelerate and stop the robot 3 in response to stop of the dynamic executable file that is being executed and inputs the robot control signal to the robot 3.

Further, in a block indicated with a sequence number "N30", the static executable file selection/start unit 524 transmits a static executable file start command signal in accordance with the extracted M code to the static executable file selection/start unit 68 of the robot control device 6 in response to the M code allocated for designating the static executable file being extracted in the numerical control program. Further, the static executable file selection/start unit 68 selects a static executable file associated with the received static executable file start command signal from the plurality of static executable files stored in the storage unit 70 in response to reception of the static executable file start command signal. The control unit 60 executes the static executable file selected by the static executable file selection/start unit 68. Note that in a block indicated with a sequence number "N30", the control unit 60 executes a static executable file for performing operation associated with the M code "M90", that is, operation of machining a workpiece. Further, if execution of the static executable file ends at the control unit 60, the static executable file selection/start unit 68 notifies the numerical control device 5 of completion of the operation associated with the M code.

Note that in blocks indicated with sequence numbers "N31", "N32" and "N33", commands "M91", "M92" and "M93" by the M code allocated for designating the static executable file are sequentially input to the static executable file selection/start unit 524 of the numerical control device 5. Thus, in the robot control device 6, a static executable file for performing operation of removing burr of a workpiece, a static executable file for performing operation of inspecting a workpiece and a static executable file for performing outputting a workpiece are sequentially executed through procedure that is the same as the procedure in the block indicated with the sequence number "N30".

Next, in a block indicated with a sequence number "N40", a command "G68.8" by the G code is input to the coordinate configuration information control unit 523 and the dynamic executable file start/stop unit 525 of the numerical control device 5. The dynamic executable file start/stop unit 525 transmits the dynamic executable file creation command signal to the dynamic executable file start/stop unit 69 of the robot control device 6 in response to the G code being extracted in the numerical control program for the first time after execution of the static executable file ends in the robot control device 6. Further, the dynamic executable file start/stop unit 69 generates a dynamic executable file again in response to reception of the dynamic executable file creation command signal and causes the control unit 60 to execute the generated dynamic executable file.

Further, in a block indicated with a sequence number "N40", the coordinate configuration information control unit 523 updates the coordinate information stored in the memory through procedure that is the same as the procedure in the sequence number "N10" described above.

Next, in a block indicated with a sequence number "N41", a command "G0 J1=_J2=_J3=_J4=_J5=_J6=_" based on the joint coordinate format is input to the robot command signal generation unit 526 of the numerical control device 5. The robot command signal generation unit 526 generates a robot command signal through procedure that is the same as the procedure in the sequence number "N11" described above and transmits the robot command signal to the robot command generation unit 64 of the robot control device 6. The robot command generation unit 64 adds the command in accordance with the received robot command signal to the dynamic executable file that is being executed at the control unit 60. The control unit 60 generates a robot control signal in accordance with the command added to the dynamic executable file and inputs the robot control signal to the robot 3.

Then, in a block indicated with a sequence number "N50", a command "M30" that declares an end program of the numerical control program is input to the dynamic executable file start/stop unit 525 of the numerical control device 5. In response to this, the dynamic executable file start/stop unit 525 generates a dynamic executable file stop command signal and transmits the dynamic executable file stop command signal to the dynamic executable file start/stop unit 69 of the robot control device 6. Further, the dynamic executable file start/stop unit 69 stops and deletes the dynamic executable file that is being executed at the control unit 60 in response to reception of the dynamic executable file stop command signal. The control unit 60 generates a robot control signal so as to decelerate and stop the robot 3 in response to stop of the dynamic executable file that is being executed and inputs the robot control signal to the robot 3.

Figure 6:
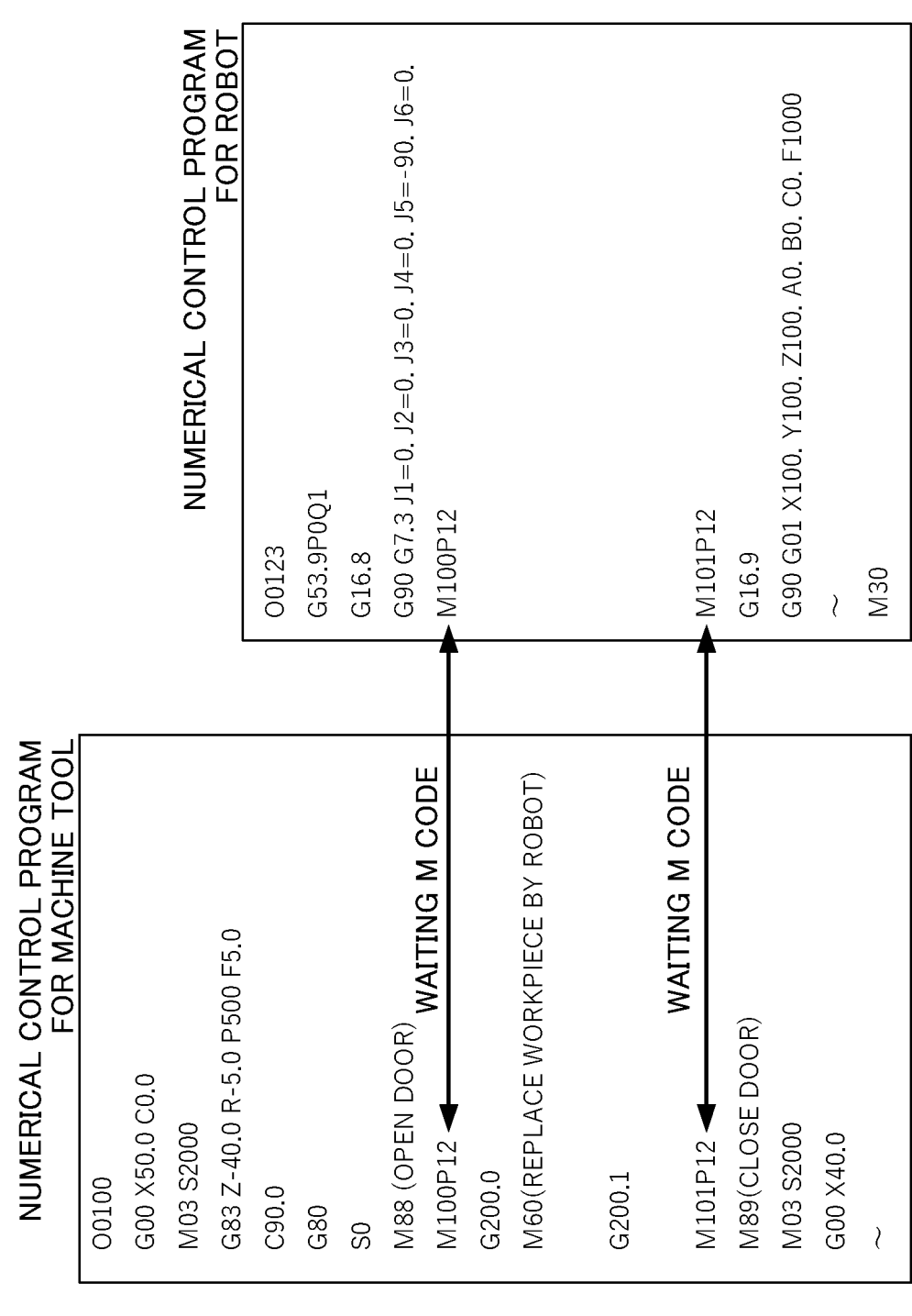
FIG. 6 is a view illustrating an example of a numerical control program for machine tool and a numerical control program for robot.

FIG. 6 indicates an example of the numerical control program for machine tool and the numerical control program for robot. FIG. 6 indicates the numerical control program for machine tool loaded at the machine tool control module 51 on the left side and indicates the numerical control program for robot loaded at the robot control module 52 on the right side.

In the example illustrated in FIG. 6, the machine tool control module 51 and the robot control module 52 execute the respective numerical control programs while achieving synchronization between blocks of waiting M codes "M100P12" and "M101P12". Further, in the example illustrated in FIG. 6, in the blocks between the waiting M codes "M100P12" and "M101P12" among the numerical control program for machine tool, the G code "G200.0" determined for designating stop of the dynamic executable file, the M code "M60" allocated for designating the static executable file, and the G code "G200.1" determined for issuing a command to create the dynamic executable file are described. On the other hand, no command is described in the blocks between the waiting M codes "M100P12" and "M101P12" among the numerical control program for robot.

Thus, in a synchronization period, the robot control module 52 does not transmit the high-level command signal to the robot control device 6. On the other hand, the machine tool control module 51 transmits the dynamic executable file stop command signal to the dynamic executable file start/stop unit 69 of the robot control device 6 in response to the G code "G200.0" being extracted in the numerical control program for machine tool. In response to this, the dynamic executable file start/stop unit 69 stops and deletes the dynamic executable file that is being executed at the control unit 60.

Then, in response to the M code "M60" being extracted in the numerical control program for machine tool, the machine tool control module 51 transmits the static executable file start command signal in accordance with the extracted M code to the static executable file selection/start unit 68 of the robot control device 6. The static executable file selection/start unit 68 selects the static executable file associated with the received static executable file start command signal from the plurality of static executable files stored in the storage unit 70 in response to reception of the static executable file start command signal. The control unit 60 executes the static executable file selected by the static executable file selection/start unit 68.

Then, the machine tool control module 51 transmits the dynamic executable file creation command signal to the dynamic executable file start/stop unit 69 of the robot control device 6 in response to the G code "G200.1" being extracted in the numerical control program for machine tool. Further, the dynamic executable file start/stop unit 69 newly generates a dynamic executable file in response to reception of the dynamic executable file creation command signal and causes the control unit 60 to execute the generated dynamic executable file.

According to the present embodiment, the following effects are provided. The numerical control device 5 generates the high-level command signal including the robot command signal for the robot 3 in accordance with the numerical control program, and the robot control device 6 generates the robot control signal for controlling the operation of the robot 3 on the basis of the high-level command signal generated by the numerical control device 5 and inputs the robot control signal to the robot 3. Here, the robot control device 6 includes the control unit 60 configured to generate the robot control signal by selectively executing one of the dynamic executable file which is generated on the basis of the dynamic executable file creation command signal and the robot command signal and which is sequentially added and the static executable file selected on the basis of the static executable file start command signal. Thus, according to the present embodiment, a user who possesses the static executable file that runs in the existing robot control device can control the operation of the robot 3 by effectively utilizing the existing static executable file as well as the dynamic executable file automatically generated on the basis of the numerical control program.

The numerical control device 5 includes the machine tool control module 51 configured to generate the machine tool command signal for the machine tool 2 in accordance with the numerical control program for machine tool and the robot control module 52 configured to generate the high-level command signal for the robot 3 in accordance with the numerical control program for robot. It is possible to control both the machine tool 2 and the robot 3 with the numerical control programs described in a common language.

The robot control device 6 includes the dynamic executable file start/stop unit 69 configured to generate the dynamic executable file on the basis of the dynamic executable file creation command signal transmitted from the numerical control device 5, cause the control unit 60 to execute the generated dynamic executable file and stop the dynamic executable file that is being executed at the control unit 60 on the basis of the dynamic executable file stop command signal transmitted from the numerical control device 5. According to the present embodiment, it is possible to execute or stop the dynamic executable file at the robot control device 6 at a timing determined on the basis of the numerical control program at the numerical control device 5, which is convenient.

The robot control device 6 includes the static executable file selection/start unit 68 configured to select one of the plurality of static executable files stored in the storage unit 70 on the basis of the static executable file start command signal and cause the control unit 60 to execute the selected static executable file. According to the present embodiment, it is possible to cause the robot control device 6 to execute the static executable file determined on the basis of the numerical control program at the numerical control device 5 at a timing determined on the basis of the numerical control program, which is convenient.

The dynamic executable file start/stop unit 69 of the robot control device 6 deletes the dynamic executable file that is being executed at the control unit 60 on the basis of the dynamic executable file stop command signal transmitted from the numerical control device 5. According to the present embodiment, it is possible to reliably resolve a state where the control unit 60 continues to exclusively possess the dynamic executable file by deleting the dynamic executable file that is being executed at the control unit 60, so that it is possible to cause the control unit 60 to continuously execute the static executable file.

The present disclosure is not limited to the above-described embodiment, and various changes and modifications are possible.

EXPLANATION OF REFERENCE NUMERALS

1 numerical control system
2 machine tool
3 robot
5 numerical control device
51 machine tool control module
52 robot control module
521 program input unit
522 input analysis unit
523 coordinate configuration information control unit
524 static executable file selection/start unit
525 dynamic executable file start/stop unit
526 robot command signal generation unit
528 data transmission/reception unit
53 storage unit
6 robot control device
60 control unit
61 data transmission/reception unit
62 input analysis unit
63 robot position management unit
64 robot command generation unit
65 program management unit
66 trajectory control unit
67 servo control unit
68 static executable file selection/start unit
69 dynamic executable file start/stop unit
70 storage unit

The invention claimed is:

1. A numerical control system comprising:
a numerical control device configured to generate a high-level command signal including a robot command signal for a robot in accordance with a numerical control program; and
a robot control device configured to perform communication with the numerical control device and generate a robot control signal for controlling operation of the robot on the basis of the high-level command signal and input the robot control signal to the robot,
wherein the numerical control device comprises:
a first storage unit configured to store the numerical control program,
an input analysis unit configured to analyze the numerical control program, a first static executable file selection/start unit configured to generate a static executable file start command signal on the basis of an analysis result from the input analysis unit and transmit to the robot control device, and a robot command signal generation unit configured to generate the robot command signal on the basis of the analysis result from the input analysis unit and transmit to the robot control device, and wherein the robot control device comprises a second storage unit configured to store a plurality of static executable files associated with operations of the robot, and a control unit configured to generate the robot control signal by selectively executing one of a dynamic executable file to which a command in accordance with the robot command signal is sequentially added and a static executable file selected from the second storage unit on the basis of the static executable file start command signal, and wherein the static executable file is a binary file executable by the control unit.

2. The numerical control system according to claim 1, wherein the numerical control device generates the high-level command signal and a machine tool command signal for a machine tool in accordance with the numerical control program.

3. The numerical control system according to claim 1, wherein the robot control device further comprises a second dynamic executable file start/stop unit configured to generate the dynamic executable file on the basis of the high-level command signal, cause the control unit to execute the generated dynamic executable file and stop the dynamic executable file that is being executed at the control unit on the basis of the high-level command signal.

4. The numerical control system according to claim 3, wherein the robot control device further comprises a second static executable file selection/start unit configured to select one of a plurality of the static executable files stored in the storage unit on the basis of the high-level command signal and cause the control unit to execute the selected static executable file.

5. The numerical control system according to claim 3, wherein the second dynamic executable file start/stop unit deletes the dynamic executable file that is being executed at the control unit on the basis of the high-level command signal.

6. A robot control method for controlling a robot by a numerical control device configured to generate a high-level command signal including a robot command signal for the robot in accordance with a numerical control program and a robot control device configured to perform communication with the numerical control device and generate a robot control signal for controlling operation of the robot on the basis of the high-level command signal and input the robot control signal to the robot, the numerical control device comprises a first storage unit configured to store the numerical control program, and the robot control device comprises a second storage unit configured to store a plurality of static executable files associated with operations of the robot, the robot control method comprising:

a step of analyzing the numerical control program at the numerical control device;

a step of generating a static executable file start command signal on the basis of an analysis result of the numerical control program and transmitting the static executable file start command signal to the robot control device at the numerical control device;

a step of generating the robot command signal on the basis of the analysis result and transmitting the robot command signal to the robot control device at the numerical control device;

a step of generating a dynamic executable file by sequentially adding instructions corresponding to the robot command signal at the robot control device;

a step of selecting the static executable file from the second storage unit on the basis of the static executable file start command signal at the robot control device; and a step of generating the robot control signal for controlling the operation of the robot by selectively executing one of the dynamic executable file and the static executable file at the robot control device and inputting the robot control signal to the robot, and wherein the static executable file is a binary file executable by a control unit of the robot control device.

7. The numerical control system according to claim 3, wherein the numerical control device further comprises a first dynamic executable file start/stop unit configured to generate a dynamic executable file creation command signal or a dynamic executable file stop command signal on the basis of an analysis result from the input analysis unit and transmit to the robot control device.

* * * * *